US012434941B2

(12) United States Patent
Appana, Jr.

(10) Patent No.: US 12,434,941 B2
(45) Date of Patent: Oct. 7, 2025

(54) SYSTEMS AND METHODS FOR DISPATCHING ELEVATORS

(71) Applicant: Appana Industries LLC, Jamaica, NY (US)

(72) Inventor: Amarnauth Appana, Jr., Jamaica, NY (US)

(73) Assignee: Appana Industries LLC, Jamaica, NY (US)

( * ) Notice: Subject to any disclaimer, the term of this patent is extended or adjusted under 35 U.S.C. 154(b) by 1045 days.

(21) Appl. No.: 17/393,910

(22) Filed: Aug. 4, 2021

(65) Prior Publication Data

US 2022/0041404 A1 Feb. 10, 2022

Related U.S. Application Data

(60) Provisional application No. 63/062,734, filed on Aug. 7, 2020.

(51) Int. Cl.
*B66B 1/24* (2006.01)
*B66B 1/34* (2006.01)
*B66B 1/46* (2006.01)

(52) U.S. Cl.
CPC .......... *B66B 1/2458* (2013.01); *B66B 1/3476* (2013.01); *B66B 1/3492* (2013.01);
(Continued)

(58) Field of Classification Search
CPC ..... B66B 1/2458; B66B 1/3476; B66B 1/468; B66B 2201/215; B66B 2201/4615; B66B 2201/233; B66B 2201/222
(Continued)

(56) References Cited

U.S. PATENT DOCUMENTS 3,207,266 A 9/1965 Hornung
3,831,715 A 8/1974 Matsuzawa et al.
(Continued)

FOREIGN PATENT DOCUMENTS

CN 107200245 A 9/2017
CN 108975109 A 12/2018
(Continued)

OTHER PUBLICATIONS

Tobita et al. (GB 2277611 A) Elevator Bank Control System (Year: 1994).*

(Continued)

*Primary Examiner* — Jorge L Carrasquillo
(74) *Attorney, Agent, or Firm* — Bookoff McAndrews, PLLC

(57) ABSTRACT

A method for reassigning a first elevator car of a plurality of elevator cars that includes dispatching the first elevator car from a current location to a first destination location to pick up an occupant at the first destination location. The method includes determining the first elevator car stopped at an intermediate location positioned between the current location and the first destination location. The method further includes determining a number of occupants within the first elevator car is greater than at least a second elevator car of a plurality of elevator cars after the first elevator car stopped at the intermediate location, and directing the first elevator car to a second destination location different from the first destination location.

20 Claims, 4 Drawing Sheets

(52) U.S. Cl.
CPC ........ *B66B 1/468* (2013.01); *B66B 2201/215* (2013.01); *B66B 2201/222* (2013.01); *B66B 2201/233* (2013.01); *B66B 2201/4615* (2013.01)

(58) Field of Classification Search
USPC ........................................................... 187/382
See application file for complete search history.

(56) References Cited

U.S. PATENT DOCUMENTS

| | | | |
|---|---|---|---|
| 3,851,733 A | | 12/1974 | Sackin et al. |
| 8,047,334 B2 | * | 11/2011 | Christy ................. B66B 1/2458 187/392 |
| 8,177,036 B2 | | 5/2012 | Stanley et al. |
| 9,505,584 B2 | * | 11/2016 | Faruki ....................... B66B 1/20 |
| 10,017,354 B2 | * | 7/2018 | Ginsberg .................. B66B 1/28 |
| 2011/0220437 A1 | * | 9/2011 | Asano ................... B66B 1/2458 187/247 |
| 2017/0121147 A1 | | 5/2017 | Stranieri et al. |
| 2020/0031612 A1 | * | 1/2020 | Akkina ................. B66B 1/2458 |

FOREIGN PATENT DOCUMENTS

| | | | | |
|---|---|---|---|---|
| CN | 110775740 | A | | 2/2020 |
| CN | 111086931 | A | | 5/2020 |
| JP | 59-177267 | A | | 10/1984 |
| JP | H02270780 | A | * | 11/1990 |
| JP | H03-102083 | A | | 4/1991 |
| JP | H06-255902 | A | | 9/1994 |
| JP | 2006-143405 | A | | 6/2006 |
| JP | 2016-016991 | A | | 2/2016 |
| JP | 2019-031370 | A | | 2/2019 |
| JP | 2019-214450 | A | | 12/2019 |

OTHER PUBLICATIONS

Extended European Search Report issued on Nov. 22, 2021 in counterpart European Patent Application 21188225.3 (7 pages, in English).

Office Action issued in counterpart Japanese Patent Application No. 2021-127348, on Sep. 27, 2022 (with English translation, 7 pages).

Chinese Notice of Grant issued on Mar. 15, 2024 in counterpart Chinese Patent Application No. 202110901020.6 (4 pages, in Chinese).

* cited by examiner

SYSTEMS AND METHODS FOR DISPATCHING ELEVATORS

CROSS-REFERENCE TO RELATED APPLICATIONS

This application claims the benefit of priority from U.S. Provisional Application No. 63/062,734, filed on Aug. 7, 2020, which is incorporated by reference herein in its entirety.

TECHNICAL FIELD

Aspects of the present disclosure relate generally to systems and methods for controlling elevator traffic flow, and specifically to examples of elevator control systems that dispatch elevator cars based on a relative occupant capacity of a group of elevator cars.

DESCRIPTION OF RELATED TECHNOLOGY

Elevator systems may generally reassign an elevator car in response to the occurrence of an error. In such systems, detection of an error, such as a mechanical or electrical failure, may be determinative of whether a call request assigned to an elevator car requires reassignment. However, reassigning a call request to another elevator car based solely on instances of a failure may result in routinely dispatching elevator cars that are occupied at near or full capacity, thereby inhibiting the prospective passengers from boarding the elevator car. Additionally, when reassigning a call to a subsequent elevator car, such systems may base said reassignment on a necessary travel time to answer the call. As such, an elevator car located within a vicinity of the call request, and having the shortest travel time to answer the call, may be dispatched to a location of the call. However, reassigning elevator cars based on a location or travel time may similarly result in dispatching elevator cars that are occupied at near or full capacity. As a result, the prospective passengers may be required to attempt another call request for a separate elevator car, thereby resulting in decreased traffic flow and greater wait times for the prospective passengers. Providing a system capable of reassigning elevator cars based on a relative occupant capacity may minimize instances of dispatching elevator cars at capacity, thereby increasing traffic flow and decreasing wait times for prospective passengers.

BRIEF DESCRIPTION OF DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

SUMMARY

Figure 1:
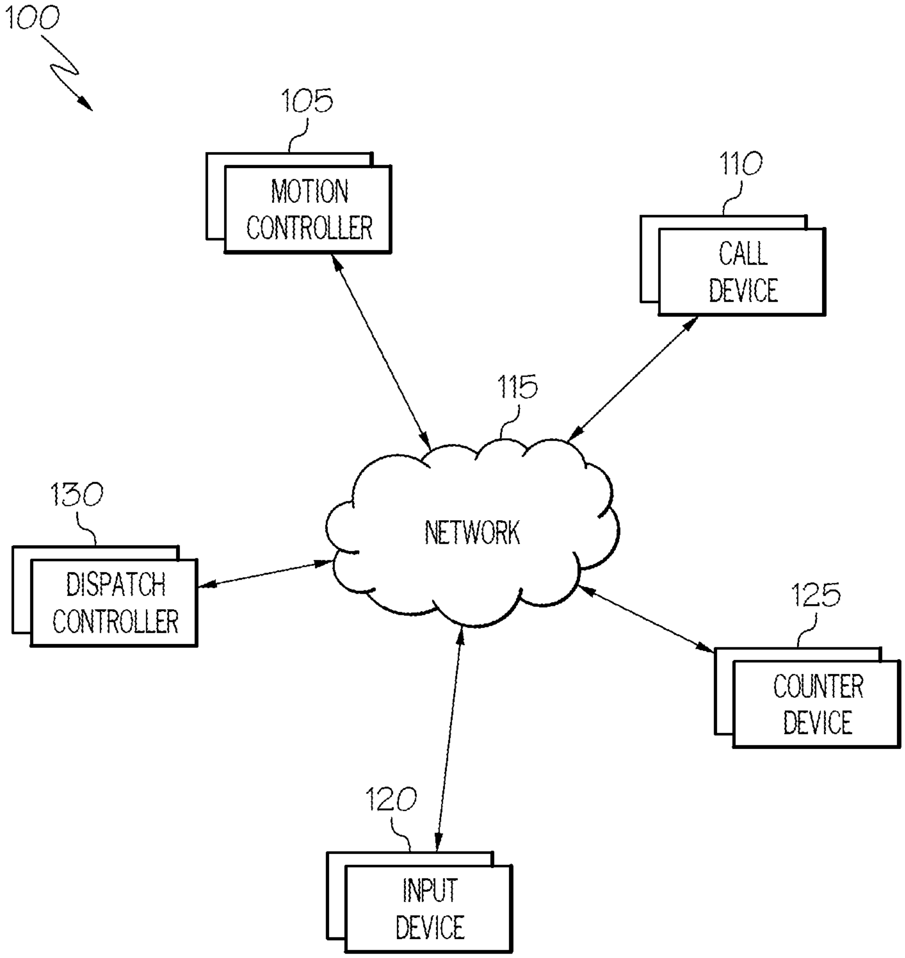
FIG. 1 depicts a dispatch system including one or more devices in communication over a network.

According to an example, a method of reassigning a first elevator car of a plurality of elevator cars includes dispatching the first elevator car from a current location to a first destination location to pick up an occupant at the first destination location. The method includes determining the first elevator car stopped at an intermediate location positioned between the current location and the first destination location and determining a number of occupants within the first elevator car is greater than at least a second elevator car of a plurality of elevator cars after the first elevator car stopped at the intermediate location. The method further includes directing the first elevator car to a second destination location different from the first destination location.

According to another example, a method of operating a first elevator car of a plurality of elevator cars includes moving the first elevator car toward a first destination location in response to a call from the first destination location and stopping the first elevator car at an intermediate location positioned prior to the first destination location. The first elevator car receives one or more occupants from the intermediate location. The method includes determining an occupant capacity of the first elevator car is smaller than at least a second elevator car after the first elevator car stops at the intermediate location. The method includes redirecting the first elevator car to a second destination location different from the first destination location such that the first elevator car does not stop at the first destination location.

According to a further example, a system for dispatching a first elevator car of a plurality of elevator cars, including a counter device positioned in the first elevator car and configured to count a number of occupants in the first elevator car and a dispatch controller operably coupled to the counter device such that the dispatch controller receives data indicative of the number of occupants in the first elevator car. The dispatch controller is configured to dispatch the first elevator car to pick up an occupant at a first destination location. The dispatch controller is configured to determine the first elevator car stopped at an intermediate location prior to picking up the occupant at the first destination location and determine the number of occupants in the first elevator car, after stopping at the intermediate location, exceeds the number of occupants in at least a second elevator car. The dispatch controller is configured to dispatch the first elevator car to a second destination location that is different than the first destination and dispatch the second elevator car to the first destination location to pick up the occupant.

DETAILED DESCRIPTION

The dispatch system of the present disclosure may be in the form of varying embodiments, some of which are depicted by the figures and further described below.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range +/−10%.

FIG. 1 shows an exemplary dispatch system 100 that may include motion controller 105, call device 110, input device 120, counter device 125, and dispatch controller 130. The one or more devices of dispatch system 100 may communicate with one another across a network 115 and in any arrangement. For example, the devices of dispatch system 100 may be communicatively coupled to one another via a wired connection, a wireless connection, or the like. In some embodiments, network 115 may be a wide area network ("WAN"), a local area network ("LAN"), a personal area network ("PAN"), etc. Network 115 may further include the Internet such that information and/or data provided between the devices of dispatch system 100 may occur online (e.g., from a location remote from other devices or networks coupled to the Internet). In other embodiments, network 115 may utilize Bluetooth® technology and/or radio waves frequencies.

Motion controller 105 may be operably coupled to a transportation unit and configured to detect and transmit motion data of the transportation unit to one or more devices of dispatch system 100, such as, for example, dispatch controller 130. For example, motion controller 105 may measure and record one or more parameters (e.g., motion data) of the transportation unit, including, but not limited to, a current location, a travel direction, a travel speed, a door location, a status, and more. Motion controller 105 may include a computing device having one or more hardware components (e.g., a processor, a memory, a sensor, a communications module, etc.) for generating, storing, and transmitting the motion data. As described in further detail herein, motion controller 105 may be operably coupled to an elevator car located within a building and dispatch system 100 may include at least one motion controller 105 for each elevator car.

Still referring to FIG. 1, call device 110 may be positioned outside the transportation unit and configured to receive a user input from one or more prospective occupants for accessing the transportation unit. For example, the user input may be indicative of a call requesting transportation from the transportation unit. Call device 100 may be configured to transmit the call request to one or more devices of dispatch system 100, such as, for example, dispatch controller 130. Call device 110 may include a keypad, a touchscreen display, a microphone, a button, a switch, etc. Call device 110 may be further configured to receive a user input indicative of a current location of the call request (e.g., a first location) and/or a destination location (e.g., a second location) from a plurality of locations.

As described in further detail herein, call device 110 may be located within a building and dispatch system 100 may include at least one call device 100 for each floor of the building. Call device 100 may be configured to transmit a message from one or more devices of dispatch system 100 (e.g., dispatch controller 130) identifying an elevator car assigned to arrive at the floor of the building to answer the call request. The message may be communicated by call device 100 via various suitable formats, including, for example, in a written form, an audible form, a graphic form, and more.

Input device 120 may be positioned inside the transportation unit and configured to receive a user input from one or more occupants of the transportation unit. For example, the user input may be indicative of a command requesting redirection of the transportation unit. Input device 120 may be configured to transmit the command to one or more devices of dispatch system 100, such as, for example, dispatch controller 130. Input device 120 may include a keypad, a touchscreen display, a microphone, a button, a switch, etc. As described in detail herein, input device 120 may be located within an elevator car and dispatch system 100 may include at least one input device 100 for each elevator car in a building. In other embodiments, input device 120 may be omitted entirely from dispatch system 100.

Still referring to FIG. 1, counter device 125 may be positioned inside the transportation unit and configured to detect and transmit occupant data of the transportation unit to one or more devices of dispatch system 100, such as, for example, dispatch controller 130. For example, counter device 125 may measure and record a number of objects located within the transportation unit, including, but not limited to, an occupant, a personal belonging, a luggage, a baggage, and more. Counter device 125 may include an optical system facing an interior of the transportation unit, such as, for example, a sensor, a camera, a light beam, an infrared detector, etc. As described in further detail herein, counter device 125 may be coupled to an elevator car that is located within a building and dispatch system 100 may include at least one counter device 125 for each elevator car of the building.

Dispatch controller 130 may be positioned outside the transportation unit and configured to receive data (e.g., motion data, a call request, a redirection command, occupant data, etc.) from one or more devices of dispatch system 100. Dispatch controller 130 may be configured to determine at least one transportation unit of a plurality of transportation units to dispatch to a location of a call request received from a prospective occupant seeking transportation. Dispatch controller 130 may be further configured to reassign a call request from an original transportation unit to another transportation unit based on the relative occupant capacity of a plurality of transportation units. Dispatch controller 130 may include a computing device (see FIG. 4) operable to perform one or more processes (see FIG. 5) for reassigning a call to at least one transportation unit having a maximum available capacity to the location of the prospective passenger. As described in further detail herein, dispatch controller 130 may be operably coupled to a plurality of elevator cars located within a building and dispatch system 100 may include at least one dispatch controller 130 for each building.

Figure 2:
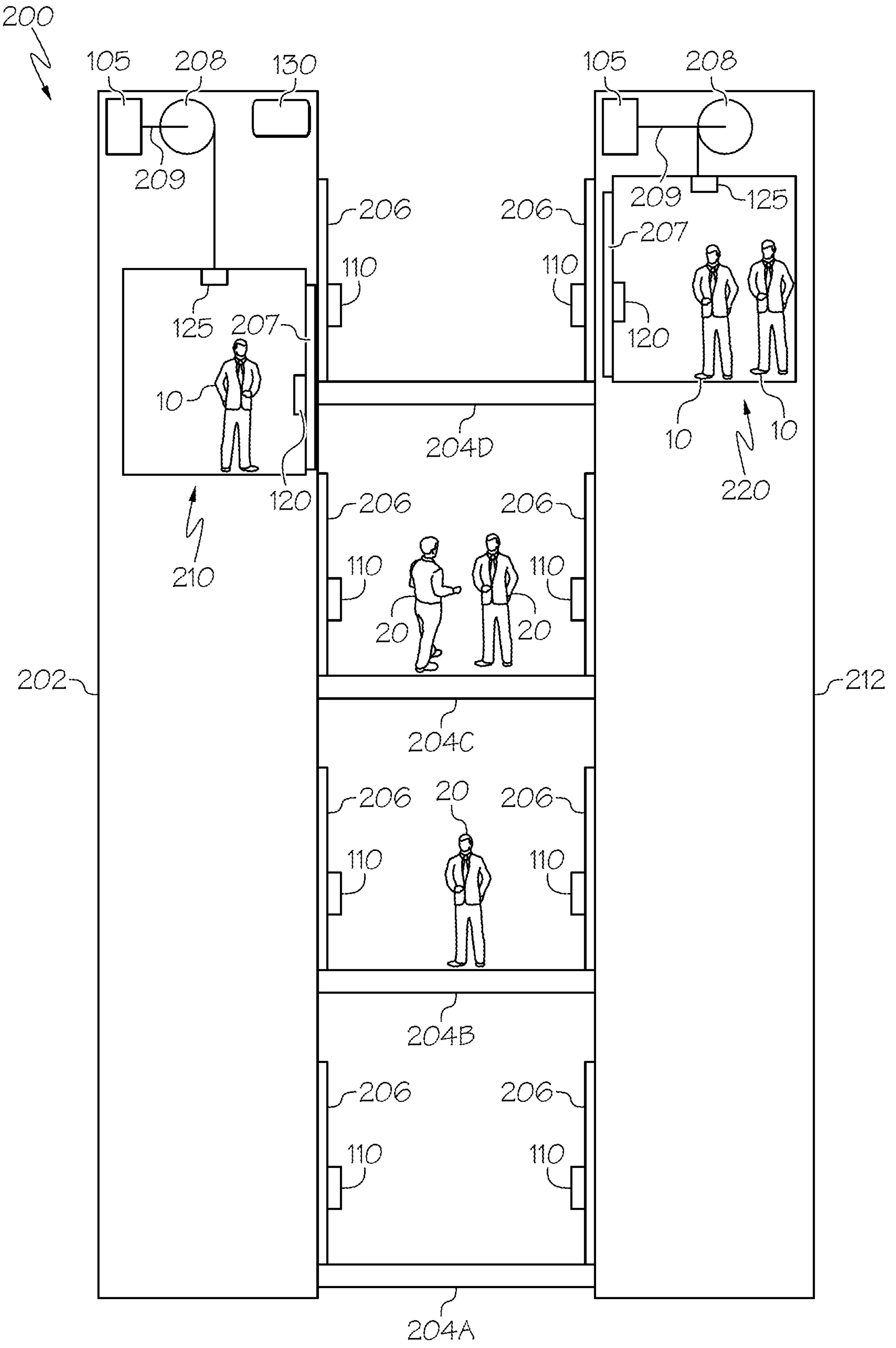
FIG. 2 is a schematic view of a working environment including multiple elevator cars interacting with the dispatch system shown in FIG. 1.

Referring now to FIG. 2, dispatch system 100 may be utilized in a working environment 200, such as a building (e.g., a facility, a factory, a store, a school, a house, an office, and various other structures). In the example, the transportation unit may include one or more elevator cars within the building. It should be appreciated that working environment 200 is merely illustrative such that dispatch system 100 may be utilized in various other suitable environments than those shown and described herein without departing from a scope of this disclosure. For example, the working environment may include a mass transit system such that the transportation unit(s) may include a bus, a train, a subway car, a metro car, a vehicle, etc. In the present example, working environment 200 may include a plurality of floors defining a plurality of locations within the building, such as first floor 204A, second floor 204B, third floor 204C, and fourth floor 204D. It should be appreciated that, in other embodiments, the building of working environment 200 may include additional and/or fewer floors.

Working environment 200 may further include one or more elevator shafts with at least one elevator car positioned within each elevator shaft. In the example, working environment 200 includes a first elevator shaft 202 with at a first elevator car 210 and a second elevator shaft 212 with a second elevator car 220. Although not shown, it should be appreciated that working environment 200 may include additional (e.g., a plurality) elevator shafts and/or elevator cars. Each elevator car 210, 220 may be coupled to a pulley system 208 configured to move elevator cars 210, 220 within elevator shafts 202, 212 and relative to floors 204A-204D. It should be understood that pulley system 208 may include various mechanical and/or electrical mechanisms for moving elevator cars 210, 220 within elevator shafts 202, 212, including but not limited to, a motor, a cable, a counterweight, a sheave, etc.

Still referring to FIG. 2, each elevator car 210, 220 may include at least one motion controller 105 operably coupled to pulley system 208, such as, for example, via a wireless connection and/or a wired connection 209. Motion controller 105 may be configured to measure motion data from elevator cars 210, 220 by detecting a relative movement of pulley system 208. Each elevator car 210, 220 may further include at least one input device 120 positioned within a cabin of elevator car 210, 220 for receiving a user input from one or more occupants 10 located within the cabin.

Each floor 204A-204D may include one or more call devices 110 and access doors 206 providing accessibility to elevator cars 210, 220 when an elevator door 207 of elevator car 210, 220 is aligned with the respective floor 204A-204D. Call device 110 may be configured to receive a user input from one or more prospective occupants 20 located at one of the plurality of floors 204A-204D. For example, call device 110 may be configured to receive a user input indicative of a call requesting transportation via at least one of elevator cars 210, 220. Call device 100 may be configured to transmit the call request to dispatch controller 130, which may include data indicative of a current location (i.e., a first location) within working environment 200 from which the call request originated from (e.g., second floor 204B). The call request may further include data indicative of a destination location (i.e., a second location) within working environment 200 to which the prospective passenger is seeking transportation to (e.g., first floor 204A).

Still referring to FIG. 2, each elevator car 210, 220 may further include at least one counter device 125 positioned within a cabin. Counter device 125 may be positioned along an inner wall (e.g., a ceiling) of each elevator car 210, 220 and configured to detect a number of occupants 10 within the cabin. In some embodiments, counter device 125 may be operable to distinguish between one or more objects detected within elevator cars 210, 220.

Figure 3:
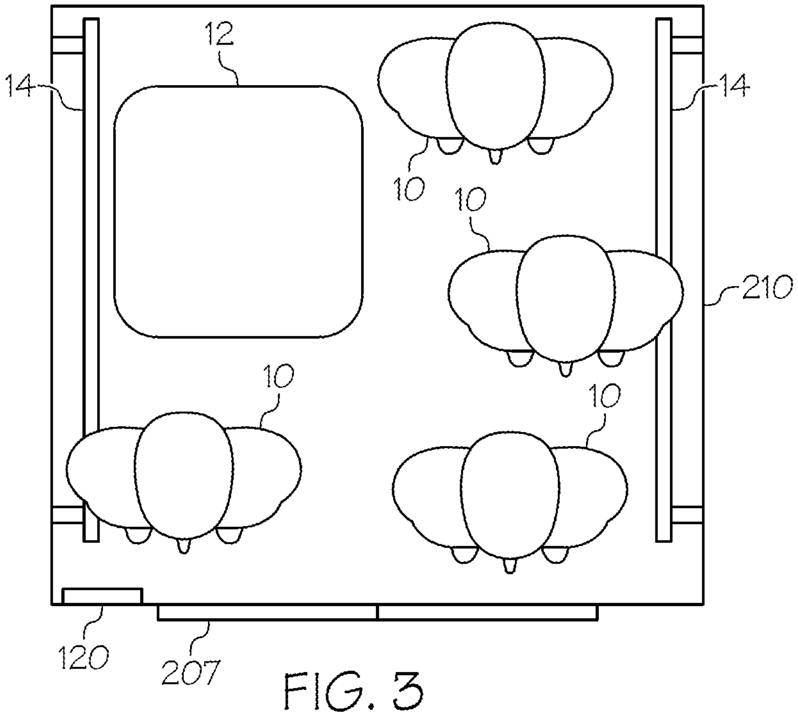
FIG. 3 is a top view of an interior of an elevator car from the working environment shown in FIG. 2.

For example, as seen in FIG. 3, counter device 125 may be configured to detect items present within the cabin and occupying a capacity of elevator cars 210, 220 (e.g., occupants 10, ancillary objects 12, etc.) and items within the cabin that may not occupy a capacity of elevator cars 210, 220 (e.g., rails 14, etc.). Counter device 125 may measure a number of items detected within elevator cars 210, 220 and record such measurements as occupant data. As discussed further herein, counter device 125 may be configured to transmit occupant data (e.g., current occupant data 142) for each elevator car 210, 220 to dispatch controller 130 via network 115.

Figure 4:
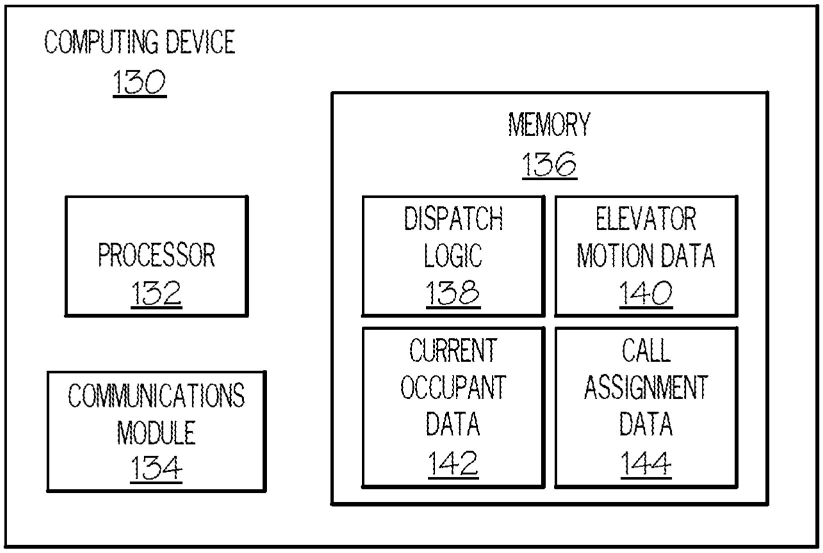
FIG. 4 is a schematic view of hardware components of a computing device from the dispatch system shown in FIG. 1.
Figure 5:
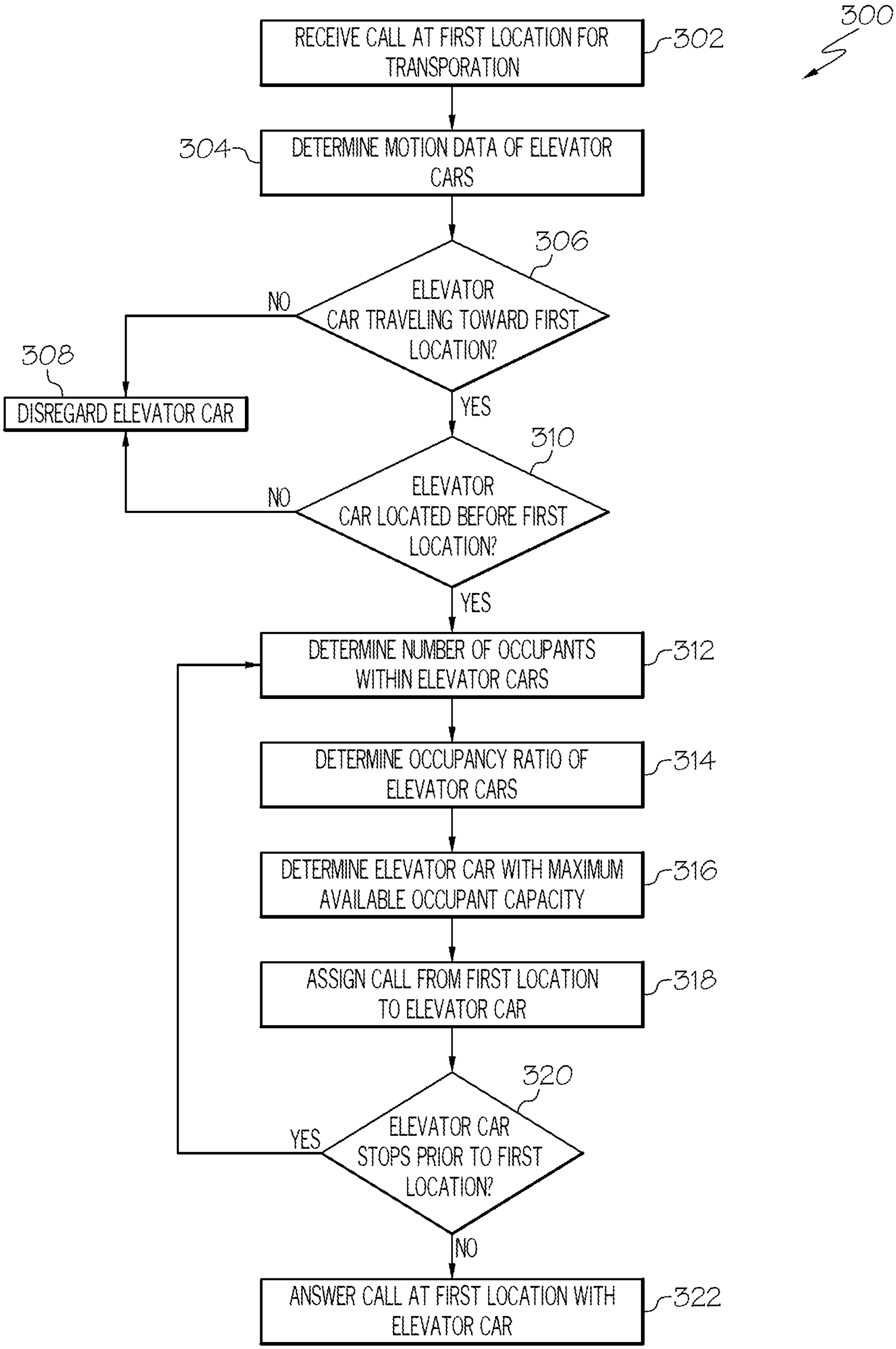
FIG. 5 is a flow diagram of an exemplary method of dispatching elevator cars with the dispatch system shown in FIG. 1.

Referring now to FIG. 4, dispatch controller 130 may include a computing device incorporating a plurality of hardware components that allow dispatch controller 130 to receive data (e.g., motion data, call requests, commands, occupant data, etc.), process information (e.g., occupant capacity), and/or execute one or more processes (see FIG. 5). Illustrative hardware components of dispatch controller 130 may include at least one processor 132, at least one communications module 134, and at least one memory 136. In some embodiments, dispatch controller 130 may include a computer, a mobile user device, a remote station, a server, a cloud storage, and the like. In the illustrated embodiment, dispatch controller 130 is shown and described herein as a separate device from the other devices of dispatch system 100, while in other embodiments, one or more aspects of dispatch controller 130 may be integrated with one or more of the other devices of dispatch system 100. Stated differently, the illustrative hardware components of dispatch controller 130 shown and described herein may be integral with one or more of motion controller 105, call device 110, input device 120, and/or counter device 125.

Processor 132 may include any computing device capable of executing machine-readable instructions, which may be stored on a non-transitory computer-readable medium, such as, for example, memory 136. By way of example, processor 132 may include a controller, an integrated circuit, a microchip, a computer, and/or any other computer processing unit operable to perform calculations and logic operations required to execute a program. As described in detail herein, processor 132 is configured to perform one or more operations in accordance with the instructions stored on memory 136, such as, for example, dispatch logic 138.

Still referring to FIG. 4, memory 136 may include various programming algorithms and data that support an operation of dispatch system 100. Memory 136 may include any type of computer readable medium suitable for storing data and algorithms, such as, for example, random access memory (RAM), read only memory (ROM), a flash memory, a hard drive, and/or any device capable of storing machine-readable instructions. Memory 136 may include one or more data sets, including, but not limited to, motion data 140 received from motion controller 105, current occupant data 142 captured from counter device 125, call assignment data 144 from call device(s) 110, and the like.

As described further herein, current occupant data 142 may include a real-time number of occupants 10 detected within a cabin of each elevator car 210, 220 by counter device 125. Call assignment data 144 may include a call request received from a prospective occupant 20 at one of the plurality of floors 204A-204D for transportation by at least of the plurality of elevator cars 210, 220. Dispatch controller 130 may be configured to store the current occupant data 142 in memory 136 and associate the number of occupants 10 with a corresponding elevator car 210, 220. Dispatch controller 130 may be further configured to store the call assignment data 144 in memory 136 to correlate with the motion data 140 and the current occupant data 142 to determine a reassignment of a call request.

Further, memory 136 may include a non-transitory computer readable medium that stores machine-readable instructions thereon, such as, dispatch logic 140. In one example, dispatch logic 140 may include executable instructions that allow dispatch system 100 to determine which elevator car from the plurality of elevator cars 210, 220 to dispatch in response to receiving a call request at a first location for transportation to a second location. Dispatch logic 140 may further facilitate determining an occupant capacity of each elevator car 210, 220 based on a number of occupants physically present within each elevator car 210, 220 to determine whether to reassign a call request to another elevator car 210, 220. As described in further detail herein, dispatch system 100 may be configured to determine the occupant capacity of each elevator car 210, 220 and a reassignment of a call request based on one or more of motion data 140, current occupant data 142, and/or call assignment data 144 received by dispatch controller 130 from motion controller(s) 105, call device(s) 110, and counter device(s) 125.

Referring now to FIG. 5, an example method 300 of using dispatch system 100 to determine an occupant capacity of a plurality of elevator cars and to reassign a call to an elevator car having a greater occupant capacity is depicted. It should be understood that the steps shown and described herein, and the sequence in which they are presented, are merely illustrative such that additional and/or fewer steps may be included in various arrangements without departing from a scope of this disclosure.

At step 302, dispatch system 100 may receive a call request at a first location of a plurality of locations within working environment 200. The call request may be initiated in response to a prospective occupant 20 actuating call device 110 at the first location, such as, for example, at second floor 204B. Call device 100 may transmit the call request to dispatch controller 130 via network 115, and the call request may include data indicative of the first location (e.g., second floor 204B) from which the call originated from. The call request may further include data indicative of a destination within working environment 200 (e.g., first floor 204A) to which the prospective occupant 20 seeks to travel.

At step 304, dispatch controller 130 may retrieve motion data 140 of each elevator car 210, 220 from a corresponding motion controller 105. Dispatch controller 130 may be configured to determine various movement parameters of each elevator car 210, 220 from the motion data 140, such as, for example, a current location of first elevator car 210 relative to first elevator shaft 202 (e.g., moving between fourth floor 204D and third floor 204C), a current travel direction of first elevator car 210 (e.g., toward first floor 204A), a current travel speed of first elevator car 210, and more. Dispatch controller 130 may further determine a current location of second elevator car 220 relative to second elevator shaft 212 (e.g., stationary at fourth floor 204D), a current travel direction of second elevator car 220 (e.g., toward first floor 204A), a current travel speed of second elevator car 220, and more.

At step 306, dispatch controller 130 may be configured to analyze motion data 140 of each elevator car 210, 220 to determine whether a current travel direction of elevator cars 210, 220 is toward the first location (e.g., second floor 204B). In response to determining one or more of elevator cars 210, 220 is not traveling toward the first location, dispatch controller 130 may be configured to disregard the particular elevator car 210, 220 from further consideration, at step 308. Stated differently, dispatch controller 130 may determine that any elevator car of the plurality of elevator cars 210, 220 traveling in a different direction than toward the first location (relative to the current location of the elevator car 210, 220) may not be an optimal elevator car to answer the call request. In the example, first elevator car 210 and second elevator car 220 may include occupants 10 traveling from fourth floor 204D to first floor 204A such that dispatch controller 130 may determine that each elevator car 210, 220 is traveling toward the first location.

Still referring to FIG. 5, at step 310, dispatch controller 130 may be configured to determine whether a current location of each elevator car 210, 220 is located prior to the first location (e.g., second floor 204B) or whether elevator cars 210, 220 have moved beyond the first location. That is, dispatch controller 130 may determine that any elevator car of the plurality of elevator cars 210, 220 that is currently positioned beyond the first location may not be an optimal elevator car to answer the call request. In response to determining one or more of elevator cars 210, 220 are not located before the first location, dispatch controller 130 may be configured to disregard the particular elevator car 210, 220 from further consideration, at step 308.

In the example, first elevator car 210 is positioned between fourth floor 204D and third floor 204C and second elevator car 220 is positioned at fourth floor 204D, such that dispatch controller 130 may determine that each elevator car 210, 220 is currently located before the first location. At steps 312 to 318, dispatch controller 130 may be configured to determine an occupant capacity of each elevator car 210, 220 in response to determining elevator cars 210, 220 are positioned at a location in elevator shaft 202, 220 prior to the first location (e.g., second floor 204B).

For example, at step 312, dispatch controller 130 may be configured to determine a number of occupants 10 within each elevator car 210, 220 by retrieving current occupant data 142 from the respective counter device 125 located within each elevator car 210, 220. In some embodiments, counter device 125 may be configured to detect a total number of occupants 10 and/or objects 12 located within each elevator car 210, 220 (see FIG. 3). Thus, dispatch controller 130 may consider one or more objects 12 detected by counter device 125 when determining the number of occupants 10 at step 312. Each counter device 125 may transmit a signal to dispatch controller 130 via network 115 indicative of the current occupant data 142 for the respective elevator car 210, 220. In the example, dispatch controller 130 may determine first elevator car 210 includes a single occupant 10 and second elevator car 220 includes two occupants 10.

Still referring to FIG. 5, at step 314, dispatch controller 130 may be configured to determine an occupancy ratio of each of the plurality of elevator cars 210, 220 based on at least the current occupant data 142 (i.e., the number of occupants 10 within each elevator car 210, 220) and a maximum occupant capacity of each elevator car 210, 220. In some embodiments, a maximum occupant capacity of each elevator car 210, 220 may be communicated to dispatch controller 130 from counter device 125 via network 115. In other embodiments, dispatch controller 130 may store the maximum occupant capacity for each of the plurality of elevator cars 210, 220 in memory 136. It should be appreciated that a size and/or shape of the cabin of each of the plurality of elevator cars 210, 220 may be determinative of a maximum occupant capacity. In the example, the plurality of elevator cars 210, 220 may include a substantially similar size and/or shape such that the maximum occupant capacity of first elevator car 210 and second elevator car 220 are relatively similar. In other examples, the plurality of elevator cars 210, 220 may include varying sizes and/or shapes such that the maximum occupant capacity of first elevator car 210 and second elevator car 220 may differ relative to one another.

In the example, with first elevator car 210 having an occupancy of one occupant 10 and a maximum occupant capacity of six occupants, dispatch controller 130 may be configured to determine first elevator car 210 has an occupancy ratio of approximately 1:6 (e.g., approximately 16.67%). Further, with second elevator car 220 having an occupancy of two occupants 10 and a maximum occupant capacity of six occupants, dispatch controller 130 may be configured to determine second elevator car 220 has an occupancy ratio of approximately 2:6 (e.g., approximately 33.33%).

Still referring to FIG. 5, at step 316, dispatch controller 130 may be configured to determine at least one of the plurality of elevator cars 210, 220 having a maximum available occupant capacity. Dispatch controller 130 may compare the occupancy ratios of each of the plurality of elevator cars 210, 220 to determine the at least one elevator car 210, 220 having the maximum available occupant capacity. In the example, with first elevator car 210 having a smaller occupancy ratio than second elevator car 220, dispatch controller 130 may be configured to determine that first elevator car 210 includes a maximum available occupant capacity for answering the call at second floor 204B. It should be appreciated that dispatch controller 130 may further compare the motion data 140 of each elevator car 210, 220 to determine which of the plurality of elevator cars 210, 220 to assign the call request.

For instance, dispatch controller 130 may compare the motion data 140 to determine one or more motion parameters of the plurality of elevator cars 210, 220 (e.g., a travel speed, an operating status, a current location, etc.). Dispatch controller 130 may analyze the motion data 140 when elevator cars 210, 220 have a similar and/or different maximum available occupant capacity. It should therefore be appreciated that dispatch controller 130 may be configured to assign the call request to at least one elevator car 210, 220 despite another one of the plurality of elevator cars 210, 220 having a greater maximum available occupant capacity. For example, dispatch controller 130 may assign the call request to first elevator car 210 based on a distance between first elevator car 210 and the first location (e.g., second floor 204B) being less than a distance between second elevator car 220 and the first location. In examples where first elevator car 210 has one or more additional call assignments relative to second elevator car 220, dispatch controller 130 may determine to assign the call request to second elevator car 220 based on a travel speed of second elevator car 220 being greater than first elevator car 210.

In the example, with first elevator car 210 having the maximum available occupant capacity relative to the plurality of elevator cars 210, 220, dispatch controller may assign the call to first elevator car 210 at step 318. In some embodiments, dispatch controller 130 may be configured to communicate with call device 100 to transmit a message to the prospective occupant 20 at the first location (e.g., second floor 204B). For example, dispatch controller 130 may communicate an identification of the at least one of the plurality of elevator cars 210, 220 assigned to answer the call request (e.g., first elevator car 210). In other embodiments, dispatch controller 130 may identify the at least one of the plurality of elevator shafts 202, 212 from which the elevator car 210, 220 may arrive from (e.g., first elevator shaft 202). The message may be transmitted via call device 110 in various suitable formats, including, for example, via a display (e.g., a written form, a graphic form, etc.), a speaker (e.g., an audible form), and more.

Still referring to FIG. 5, at step 320, dispatch controller 130 may be configured to determine whether first elevator car 210 stops at an intermediate location prior to arriving at the first location to answer the call request received at step 302. In embodiments, dispatch controller 130 may detect that first elevator car 210 has stopped at an intermediate location (e.g., third floor 204C) that is positioned before the first location (e.g., second floor 204B) in response to receiving motion data 140 from motion controller 105 indicating such movement. For example, the motion data 140 may indicate a current location of first elevator car 210 at the intermediate location when a travel speed of first elevator car 210 is reduced to zero. In some embodiments, dispatch controller 130 may determine that first elevator car 210 is to stop at the intermediate location in response to receiving a user input from input device 120 within first elevator car 210. In other embodiments, dispatch controller 130 may be configured to detect elevator doors 206 of first elevator car 210 opening at the intermediate location and/or access doors 207 at second floor 204B opening for first elevator shaft 202.

In further embodiments, dispatch controller 130 may detect that a subsequent call request assigned to first elevator car 210 (e.g., call assignment data 144) is from the intermediate location. In the example, the subsequent call request may be received by dispatch controller 130 and assigned to first elevator car 210 at a time point after the call request from step 302 is assigned to first elevator car 210 at step 318. In another example, the subsequent call request may be received by dispatch controller 130 and assigned to first elevator car 210 at a time point before the call request from step 302 is assigned to first elevator car 210 at step 318. It should be understood that dispatch controller 130 may determine whether first elevator car 210 stops at the intermediate location by various other suitable methods using the motion data 140, the current occupant data 142, and/or the call assignment data 144 without departing from a scope of the present disclosure.

Still referring to FIG. 5, in response to determining first elevator car 210 has not (or is not assigned to) stop at an intermediate location prior to the first location at step 320, dispatch controller 130 is configured to maintain the dispatch of first elevator car 210 to the first location (e.g., second floor 204B) to answer the call at step 322. Alternatively, in response to determining first elevator car 210 has (or is assigned to) stop at an intermediate location prior to reaching the first location at step 320, dispatch controller 130 is configured to conduct a reassignment assessment for the call request received at step 302. It should be appreciated that first elevator car 210 may receive one or more prospective occupants 20 from the intermediate location (e.g., third floor 204C) prior to arriving to the first location (e.g., second floor 204B) such that dispatch controller 130 may determine whether first elevator car 210 remains an optimal elevator car from the plurality of elevator cars 210, 220 to answer the call request.

Dispatch controller 130 may reevaluate an occupant capacity of each of the plurality of elevator cars 210, 220 at steps 312 to 316. At step 312, dispatch controller 130 may retrieve updated occupant data 142 from the plurality of elevator cars 210, 220 via the respective counter device 125 located within each elevator car 210, 220. The updated occupant data 142 may reflect any prospective occupants 20 received in first elevator car 210 from the intermediate location, or any occupants 10 exiting first elevator car 210 at the intermediate location. The updated occupant data 142 may further include an updated count of the number of occupants 10 in each of the plurality of elevator cars 210, 220. At step 314, dispatch controller 130 may compute an updated occupancy ratio of each of the plurality of elevator cars 210, 220 based on the updated occupant data 142. At step 316, dispatch controller 130 may determine whether first elevator car 210 maintains the maximum available occupant capacity relative to the plurality of elevator cars 210, 220, or whether at least one of the remaining plurality of elevator cars 210, 220 (e.g., second elevator car 220) includes an available occupant capacity that is greater than that of first elevator car 210.

In response to determining first elevator car 210 includes the maximum available occupant capacity relative to the remaining plurality of elevator cars within working environment 200, dispatch controller 130 may be configured to reaffirm the assignment of the call request to first elevator car 210 at step 318. Alternatively, in response to determining first elevator car 210 does not include the maximum available occupant capacity relative to the at least one of the remaining plurality of elevator cars (e.g., second elevator car 220), dispatch controller 130 may be configured to reassign the call received at step 302 to the elevator car having the maximum available occupant capacity. In the example, first elevator car 210 may receive two prospective occupants 20 from third floor 204C (e.g., the intermediate location) prior to arriving to second floor 204B (e.g., the first location). Accordingly, the number of occupants 10 in first elevator car 210 may equal three occupants 10 while the number of occupants 10 in second elevator car 220 may equal two occupants 10. In this instance, dispatch controller 130 may determine second elevator car 220 includes a smaller occupancy ratio (and a greater maximum available occupant capacity) than first elevator car 210.

Still referring to FIG. 5, at step 318, dispatch controller 130 may reassign the call from first elevator car 210 to second elevator car 220. It should be appreciated that dispatch controller 130 may further compare the motion data 140 of each elevator car 210, 220 when reassessing the original assignment and determining which of the plurality of elevator cars 210, 220 to reassign the call request. Accordingly, dispatch controller 130 may retrieve and compare updated motion data 140 of each of the plurality of elevator cars 210, 220 relative to one another, in addition to the updated occupant data 142, to determine whether to reassign the call request from first elevator car 210 to at least one of the other plurality of elevator cars in working environment 200.

In response to determining first elevator car 210 includes a greater occupancy ratio (and a smaller maximum available occupant capacity) relative to second elevator car 220, dispatch controller 130 may be configured to direct first elevator car 210 to a second location (e.g., first floor 204A) that is different than the first location (e.g., second floor 204B). In other words, dispatch controller 130 may redirect first elevator car 210 to a second destination such that first elevator car 210 does not stop at the first location (e.g., second floor 204B) to answer the call initially assigned to first elevator car 210 at step 318. Therefore, the call request received at step 302 may no longer be assigned to first elevator car 210 such that first elevator car 210 may forgo stopping at the first destination location at second floor 204B.

Still referring to FIG. 5, with the call reassigned to second elevator car 220 at step 318, dispatch controller 130 may determine whether second elevator car 220 has (or will) stop at an intermediate location at step 320. In response to determining second elevator car 220 does not stop at an intermediate location prior to arriving at the first location (e.g., second floor 204B), dispatch controller 220 may maintain the call assignment from second floor 204B with second elevator car 210. Alternatively, dispatch controller 130 may repeat steps 312 to 318 in response to determining second elevator car 220 has stopped at an intermediate location.

All technical and scientific terms used herein have the same meaning as commonly understood to one of ordinary skill in the art to which this disclosure belongs unless clearly indicated otherwise. As used herein, the singular forms "a", "an", and "the" include plural references unless the context clearly dictates otherwise.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

What is claimed is:

1. A method of reassigning a first elevator car of a plurality of elevator cars, comprising:

determining the first elevator car, being dispatched from a current location to a first destination location to receive an occupant, has stopped at an intermediate location positioned between the current location and the first destination location;

determining a first occupancy number of the first elevator car after departing from the intermediate location, wherein the first occupancy number includes a number of occupants within the first elevator car and a number of objects within the first elevator car;

determining the first occupancy number of the first elevator is greater than a second occupancy number of a second elevator car of the plurality of elevator cars after the first elevator car stopped at the intermediate location; and reassigning the first elevator car to a second destination location different from the first destination location.

2. The method of claim 1, wherein the number of objects includes one or more personal belongings, luggage, baggage, or ancillary objects in the first elevator car.

3. The method of claim 1, further comprising:

dispatching the second elevator car to the first destination location to receive the occupant in response to the first occupancy number of the first elevator car being greater than the second occupancy number of the second elevator car.

4. The method of claim 3, further comprising:

transmitting a notification to the first destination location identifying the second elevator car being dispatched to the first destination location to receive the occupant in substitute of the first elevator car.

5. The method of claim 1, prior to directing the first elevator car to the second destination location, the method further comprises:

determining a ratio between the number of occupants and the number of objects within each of the plurality of elevator cars and a capacity of each of the plurality of elevator cars; and comparing the ratio of each of the plurality of elevator cars relative to one another.

6. The method of claim 5, further comprising:

determining the ratio of the second elevator car is less than the ratio of the first elevator car and a remaining plurality of elevator cars.

7. The method of claim 1, further comprising:

determining a first travel speed of the first elevator car towards the first destination location is greater than a second travel speed of the second elevator car towards the first destination location; and forgoing directing the first elevator car to the second destination location in response to the first travel speed being greater than the second travel speed, such that the first elevator car remains dispatched to the first destination location despite the occupancy number of the first elevator being greater than the second elevator car.

8. The method of claim 1, further comprising:

determining a first distance between the current location of the first elevator car and the first destination location is less than a second distance between the current location of the second elevator car and the first destination location; and forgoing directing the first elevator car to the second destination location in response to the first distance being less than the second distance, such that the first elevator car remains dispatched to the first destination location despite the occupancy number of the first elevator being greater than the second elevator car.

9. The method of claim 1, further comprising:

determining a first number of call requests assigned to the first elevator car is less than a second number of call requests assigned to the second elevator car; and forgoing directing the first elevator car to the second destination location in response to the first number of call requests being less than the second number of call requests, such that the first elevator car remains dispatched to the first destination location despite the occupancy number of the first elevator being greater than the second elevator car.

10. The method of claim 1, prior to determining the first elevator car has stopped at an intermediate location, the method further comprises:

receiving a call for at least one of the plurality of elevator cars from the occupant at the first destination location; and determining the first occupancy number of the first elevator car is less than the second occupancy number of the second elevator car and each of a remaining plurality of elevator cars.

11. The method of claim 10, further comprising:

assigning the call from the first destination location to the first elevator car in response to the first occupancy number of the first elevator car being less than the second occupancy number of the second elevator car and each of the remaining plurality of elevator cars; and dispatching the first elevator car to the first destination location to receive the occupant.

12. The method of claim 11, further comprising:

transmitting a notification to the first destination location identifying the first elevator car being dispatched to the first destination location to receive the occupant.

13. A method of operating a first elevator car of a plurality of elevator cars, comprising:

stopping the first elevator car, being dispatched to a first destination location to receive an occupant, at an intermediate location positioned prior to the first destination location, wherein the first elevator car receives one or more occupants and one or more objects from the intermediate location;

determining a first occupancy number of the first elevator car after departing from the intermediate location, wherein the first occupancy number includes a number of occupants within the first elevator car and a number of objects within the first elevator car;

determining the first occupancy number of the first elevator is greater than a second occupancy number of a second elevator car of the plurality of elevator cars after the first elevator car stops at the intermediate location; and redirecting the first elevator car to a second destination location different from the first destination location such that the first elevator car does not stop at the first destination location.

14. The method of claim 13, wherein the number of objects includes one or more personal belongings, luggage, baggage, or ancillary objects in the first elevator car.

15. The method of claim 13, further comprising:

directing the second elevator car to the first destination location to receive the occupant in response to the first occupancy number of the first elevator car being greater than the second occupancy number of the elevator car.

16. The method of claim 13, wherein prior to redirecting the first elevator car to the second destination location, the method further comprises:

determining a ratio between the number of occupants and the number of objects within each of the plurality of elevator cars and a capacity of each of the plurality of elevator cars;

comparing the ratio of each of the plurality of elevator cars relative to one another; and determining the ratio of the second elevator car is less than the ratio of the first elevator car and a remaining plurality of elevator cars.

17. The method of claim 13, further comprising:

determining a first travel speed of the first elevator car towards the first destination location is greater than a second travel speed of the second elevator car towards the first destination location;

determining a first distance between a current location of the first elevator car and the first destination location is less than a second distance between the current location of the second elevator car and the first destination location; or determining a first number of call requests assigned to the first elevator car is less than a second number of call requests assigned to the second elevator car.

18. The method of claim 17, further comprising:

forgoing redirecting the first elevator car to the second destination location, such that the first elevator car remains dispatched to the first destination location despite the first occupancy number of the first elevator being greater than the second occupancy number of the second elevator car, in response to one or more of:

the first travel speed being greater than the second travel speed;

the first distance being less than the second distance; or the first number of call requests being less than the second number of call requests.

19. A system for dispatching a plurality of elevator cars, comprising:

a counter device positioned in each of the plurality of elevator cars, wherein the counter device is configured to count a number of occupants and a number of objects in the plurality of elevator cars; and a dispatch controller communicatively coupled to the counter device in the plurality of elevator cars such that the dispatch controller receives data indicative of the number of occupants and the number of objects in the plurality of elevator cars;

wherein the dispatch controller is configured to:

determine a first elevator car of the plurality of elevator cars, being dispatched to a first destination location to receive an occupant, has stopped at an intermediate location prior to arriving at the first destination location;

determine a first occupancy number of the first elevator car after departing from the intermediate location, wherein the first occupancy number includes a number of occupants within the first elevator car and a number of objects within the first elevator car;

determine the first occupancy number of the first elevator car exceeds a second occupancy number of a second elevator car of the plurality of elevator cars; and dispatching the first elevator car to a second destination location that is different than the first destination location and dispatching the second elevator car to the first destination location to receive the occupant.

20. The system of claim 19, wherein the number of objects includes one or more personal belongings, luggage, baggage, or ancillary objects within the first elevator car.

* * * * *